(12) United States Patent
Subramanian et al.

(10) Patent No.: US 10,466,970 B2
(45) Date of Patent: Nov. 5, 2019

(54) JURISDICTION BASED LOCALIZATIONS AS A SERVICE

(71) Applicant: SAP SE, Walldorf (DE)

(72) Inventors: Arun Subramanian, Bangalore (IN); Praveenkumar Arangotte Kozhisseri, Bangalore (IN); Rachit Mathur, Bangalore (IN)

(73) Assignee: SAP SE, Walldorf (DE)

( * ) Notice: Subject to any disclaimer, the term of this patent is extended or adjusted under 35 U.S.C. 154(b) by 166 days.

(21) Appl. No.: 14/956,913

(22) Filed: Dec. 2, 2015

(65) Prior Publication Data

US 2017/0109137 A1 Apr. 20, 2017

(30) Foreign Application Priority Data

Oct. 20, 2015 (IN) .......................... 5650/CHE/2015

(51) Int. Cl.
*G06F 8/30* (2018.01)
*G06F 9/451* (2018.01)
*G06F 8/71* (2018.01)

(52) U.S. Cl.
CPC .............. *G06F 8/30* (2013.01); *G06F 9/454* (2018.02); *G06F 8/71* (2013.01)

(58) Field of Classification Search
CPC ........................................................ G06F 8/30
USPC ........................................................ 717/110
See application file for complete search history.

(56) References Cited

U.S. PATENT DOCUMENTS

| 7,353,498 | B2 * | 4/2008 | Gupta | G06F 11/3636 |
| | | | | 714/E11.207 |
| 7,921,412 | B1 * | 4/2011 | Laura | G06F 11/302 |
| | | | | 709/213 |
| 8,296,267 | B2 | 10/2012 | Cahill et al. | |
| 8,505,004 | B2 | 8/2013 | Burke | |
| 8,793,230 | B2 | 7/2014 | Engelko et al. | |
| 2008/0307468 | A1 * | 12/2008 | Zeng | H04N 7/17336 |
| | | | | 725/93 |
| 2009/0265202 | A1 * | 10/2009 | Zhou | G06Q 10/06 |
| | | | | 705/7.13 |
| 2010/0049373 | A1 * | 2/2010 | Catsburg | G06F 8/62 |
| | | | | 701/1 |

(Continued)

*Primary Examiner* — Chat C Do
*Assistant Examiner* — Bradford F Wheaton
(74) *Attorney, Agent, or Firm* — Fish & Richardson P.C.

(57) ABSTRACT

Various embodiments of systems and methods are described herein for executing software programs deployed in a distributed network. The enterprise application specific to a geographical jurisdiction may request for the software programs deployed in the distributed network to execute a specific business process. The enterprise application sends a service request to the distributed network for completion of a business process specific to the given jurisdiction. An application executing in the distributed network receives such service requests from multiple enterprise applications. The application retrieves the appropriate software program (s) deployed in the distributed network and generates the localization software program based on the received service request. Execution of the localization software program facilitates completion of the requested business process by generating reports specific to the given jurisdiction. The application may send these generated reports to concerned entities such as enterprise application or legal authorities.

12 Claims, 6 Drawing Sheets

(56) References Cited

U.S. PATENT DOCUMENTS

| | | | |
|---|---|---|---|
| 2011/0296508 A1* | 12/2011 | Os | G06F 21/445 |
| | | | 726/7 |
| 2012/0102480 A1 | 4/2012 | Hopmann et al. | |
| 2012/0260136 A1* | 10/2012 | Jeong | G06F 11/3636 |
| | | | 714/45 |
| 2014/0033184 A1 | 1/2014 | Pendergrass et al. | |
| 2014/0096128 A1 | 3/2014 | Pohlmann | |
| 2014/0258979 A1 | 9/2014 | Zhang et al. | |
| 2015/0012481 A1* | 1/2015 | Guisado | G06F 17/30557 |
| | | | 707/603 |
| 2015/0095644 A1* | 4/2015 | Gupta | H04L 9/0825 |
| | | | 713/168 |
| 2015/0254073 A1* | 9/2015 | Menard | G06F 8/71 |
| | | | 717/122 |

\* cited by examiner

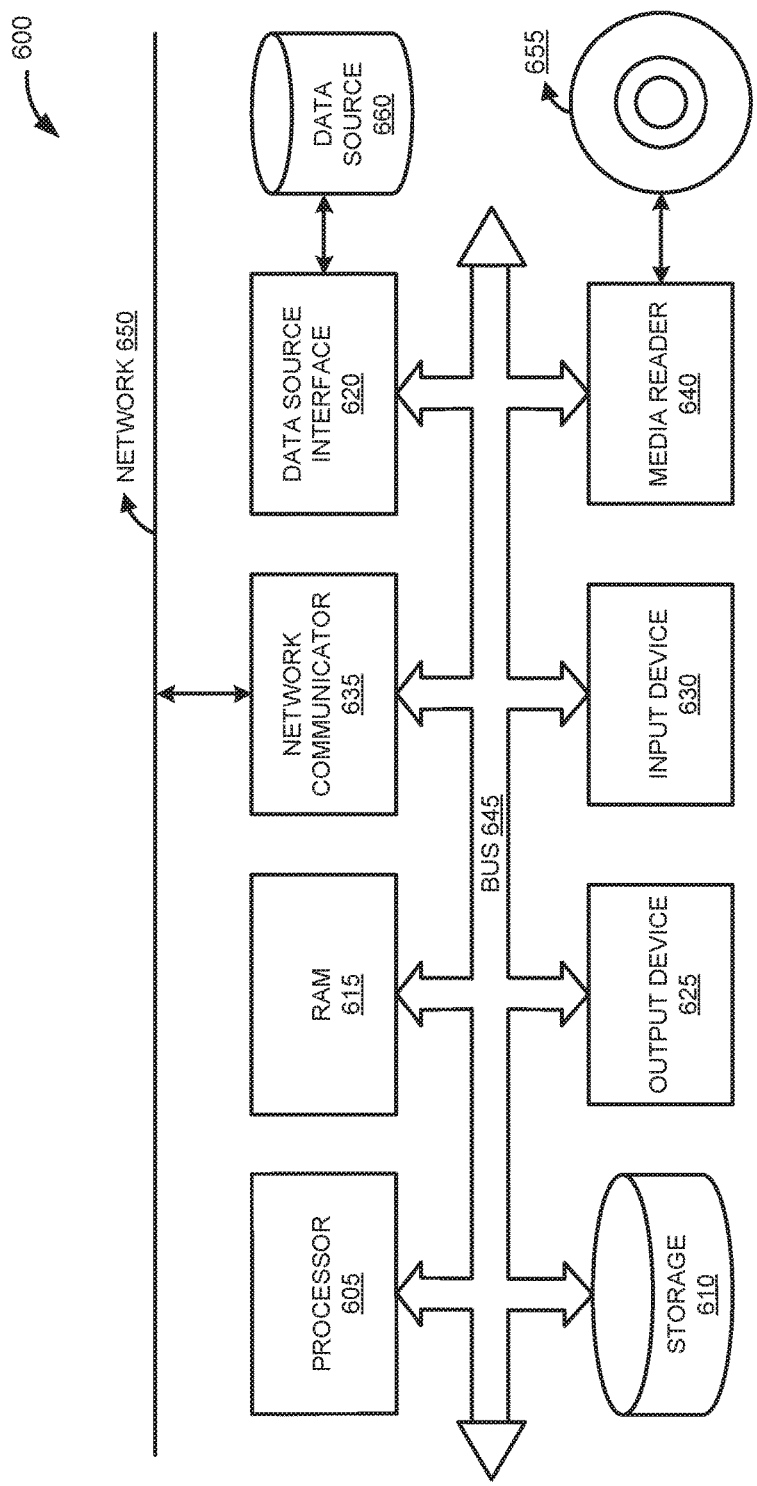

JURISDICTION BASED LOCALIZATIONS AS A SERVICE

CROSS REFERENCE

This application claims the benefit of and priority to Indian Provisional Patent Application No. 5650/CHE/2015, filed 20 Oct. 2015, titled "JURISDICTION BASED LOCALIZATIONS AS A SERVICE," which is incorporated herein by reference in its entirety.

FIELD

Embodiments generally relate to computer systems, and more particularly to methods and systems for distributed network based software applications.

BACKGROUND

Conventionally, a software product executing various business process steps across multiple geographical jurisdictions require multiple localization files for its compliance. This is done by embedding multiple localization programs within the software product that ensures legal compliance of the software product across various jurisdictions. A localization file is specific to a particular geographical jurisdiction.

One of the issues with using localization files is that these files have to be frequently modified based on the changes in legal regulations of the given jurisdiction. Due to this, the operation of the software products are frequently hinder to modify the localization files according to the legal changes for a particular jurisdiction. Additionally, embedding localization files into the software product is labor intensive and often requires a significant amount of time to incorporate the changes.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 6 is a block diagram illustrating a computing environment in which the techniques described for executing software programs deployed in a distributed network, according to an embodiment.

DETAILED DESCRIPTION

The subject matter of this document is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Although the terms "step", "block", or "component", etc., might be used herein to connote different components of methods or system employed, the terms should not be interpreted as implying any particular order among or between various steps herein disclosed unless and except when the order of individual steps is explicitly described.

Embodiments of techniques for deployment of jurisdiction based localization as a service are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
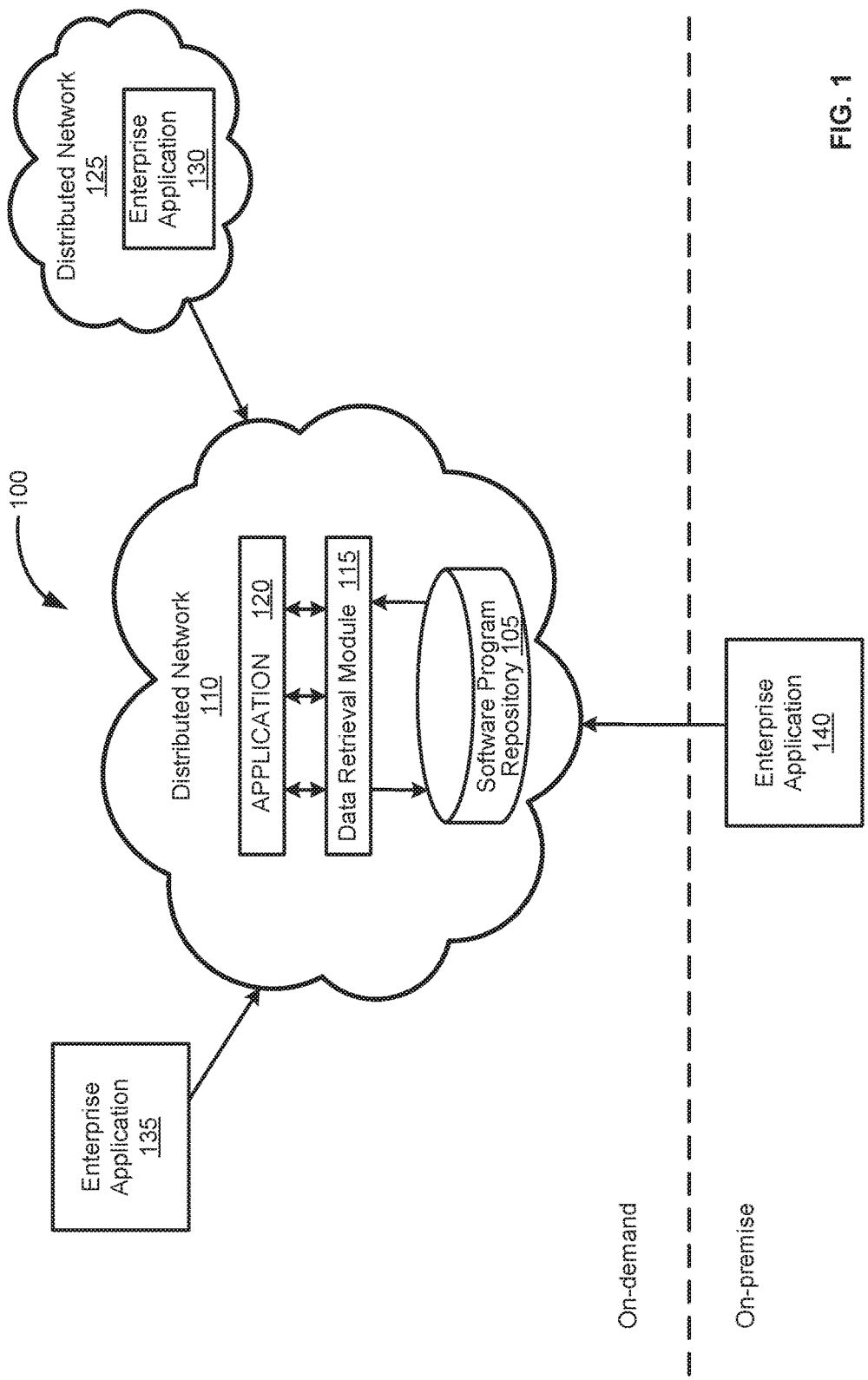
FIG. 1 is a block diagram illustrating a system deployed in a distributed network, in accordance with an embodiment.

FIG. 1 illustrates a block diagram of a system 100 deployed in a distributed network 110. In one embodiment, the distributed network may relate to a computer network that is spread across different networks. This provides single data communication network that can be managed jointly or separately by other networks. The distributed network may include network management software that manages and monitors data routing, network bandwidth allocation, access control and other networking process. Examples of distributed network may include cloud network or client/server architecture or grid network. The cloud network provides single data communication channel to access hosted services remotely. In an embodiment, an application 120 may execute in the distributed network 110. The distributed network 110 may be localized distributed network. The application 120 may relate to a distributed network application or a cloud application. The distributed network application is a software application that enables users to access the application from different networks. The cloud application is a software application that includes features of desktop applications as well as web application. Additionally, cloud application may be accessed remotely through Internet.

The application 120 may communicate with a data retrieval module 115 to transfer and retrieve data from a software program repository 105. The software program repository 105 may store jurisdictional documents, jurisdictional file formats and form layouts. The application 120 may use these documents, jurisdictional file formats and form layouts for generating various legal documents applicable to a particular jurisdiction as and when required. In an embodiment, the legal documents are generated and directly provided to the legal authorities of a particular jurisdiction. For example, user processing or filing Income Tax Returns (ITR) in India using the application 120 operating in the distributed network 110. Upon successful submission of the ITR, the application 120 may send collective report of ITR filed by users to the Indian Income Tax department.

The software program repository 105 may store software programs that may be deployed and executed by the application 120 in the distributed network 110 when a request is received. For example, the application 120 may receive a service request for computing tax. The service request may relate to computing tax for launching a product, such as a software to manage sale of commodities. In this example, the computed tax is the amount of tax to be paid by a pesticide company 'PEST-ABC' operating in Mexico. The application 120 may send a retrieve request to the software program repository 105 to retrieve a software program, for example software related to tax computation based on Mexico tax laws. In an embodiment, the application 120 may receive various types of service requests, for example such as tax computation for sale of a commodity, generating online documents specific to provided services, statutory reporting, jurisdiction based reporting, printing services, banking reporting and the like. The application 120 may receive the aforementioned service requested from multiple enterprise applications (130, 135) executing on-demand environment. The enterprise applications (130, 135) executing on-demand basis may be located in the same distributed network or in different distributed network.

The enterprise application 130 executing in another distributed network 125 may connect with the application 120 executing in the distributed network 110 via Internet. In one embodiment, the enterprise application 130 may connect with the application 120 requesting for a service provided by the software programs stored in the software program repository 120. For example, the distributed network 125 may be a cloud network of a pesticide company 'XYZ-PEST' operating in a jurisdiction, e.g. United States. The pesticide company 'XYZ-PEST' may want to extend their business of supplying pesticides for sugarcane farming in another geographical jurisdiction, e.g. Cuba. To extend businesses in the Cuban market, the company 'XYZ-PEST' may like to know tax to be paid to the Cuban legal authority. The enterprise application 135 executing on-demand basis may directly send service request to the application 120 executing in the distributed network 110 for completion of various business processes in real time. For example, the enterprise application 135 may send the service request for computing tax related business extension in a given jurisdiction Cuba.

In another embodiment, the application 120 may receive similar service requests from an on-premise enterprise application 140, as shown in the FIG. 1. The enterprise applications (130, 135 and 140) may send multiple service requests to the application 120 by making application programming interface (API) calls. In an exemplary embodiment, the API calls are implemented using oData (open data protocol). oData is a data access protocol built on core protocols such as hypertext transfer protocol (HTTP) and representational state transfer (REST) or RESTful protocols. Due to this oData facilitates in creating and consuming APIs. In an embodiment, the software program repository 105 may be located within the distributed network 110. The distributed network 110 may connect with multiple repositories similar to the software program repository 105, located outside for exchanging data.

In an embodiment, the application 120 may continuously communicate with the legal authorities of the given jurisdiction via secured jurisdictional gateway. The jurisdictional gateway provides secure access based on granted permissions. The application 120 may obtaining purposeful legal information of the given jurisdiction. For example, when there is change in format of tax submission forms applicable in the current year then the legal authority or income tax department of that particular jurisdiction may issue notification of the change in format of the current tax submission forms. The application 120 receives this information and updates related software programs stored in the software program repository 105. The application 120 may also receive the new format of the tax submission forms and store the forms in the software program repository 105.

Figure 2:
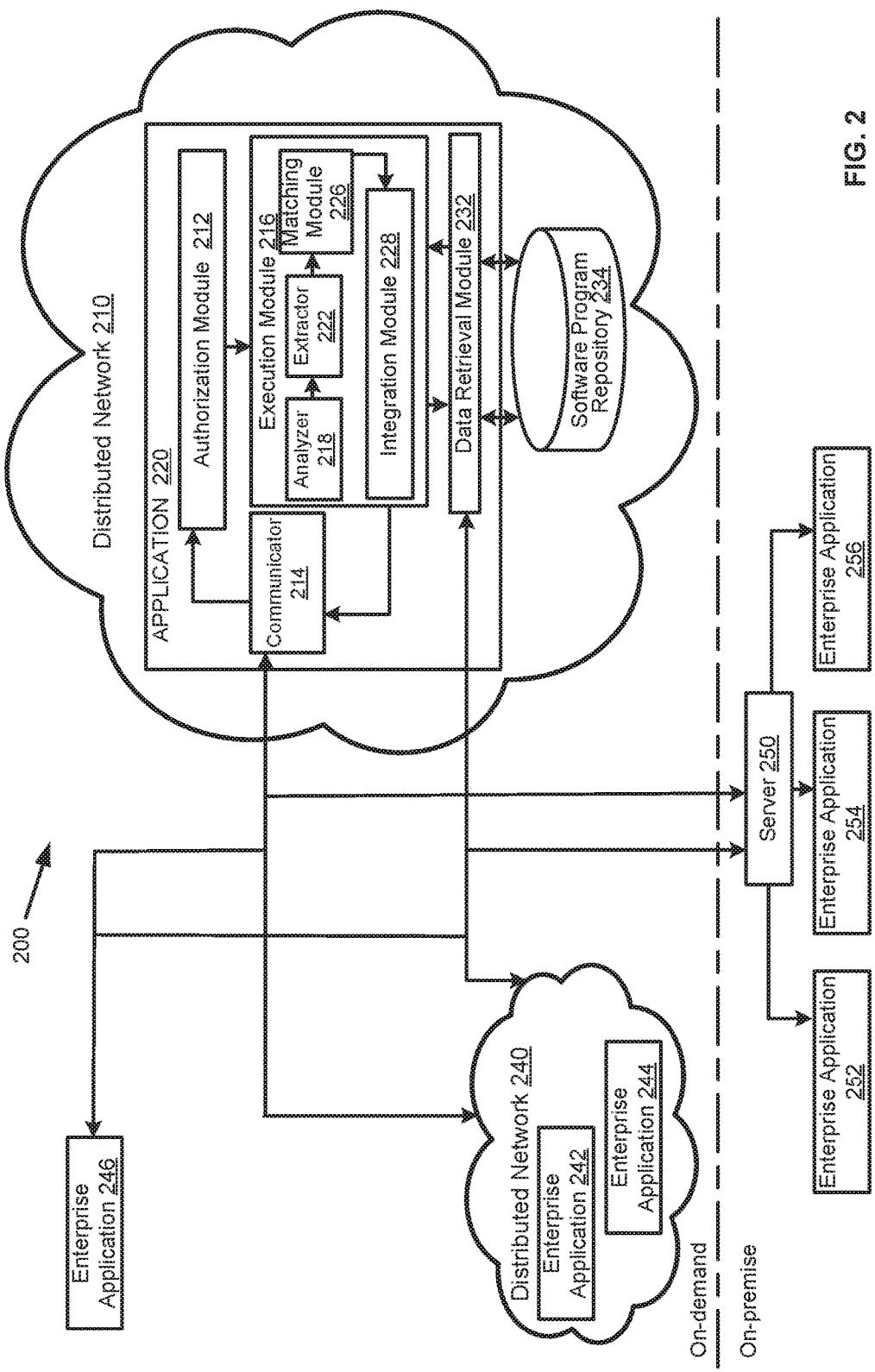
FIG. 2 illustrates a detailed block diagram of the system for executing software programs deployed in a distributed network, according to an embodiment.

FIG. 2 illustrates a detailed block diagram of system 200 for executing software programs deployed in a distributed network 210, according to an embodiment. In an e embodiment, a software application may include a first software program and a second software program. For example, the software application may relate to an income tax computation in a given jurisdictions, e.g. India and Germany. The first program may capture details of employees or employers working in multiple organizations in India and Germany. The second program may compute income tax to be paid by the employees or employers in the given jurisdictions, e.g. India and Germany. The income tax department of India may issue notifications related to new tax computation rules. The software application needs to be updated with the new tax computation rules issued by the given jurisdiction, e.g. India.

In an embodiment, the second software programs are detached from the original software application and deployed in the distributed network 210. An application 220 stores the second software programs in software program repository 234. The application 220 is enabled to communicate with the jurisdictional severs, e.g. Indian servers, Germany servers, United States servers etc., through secure jurisdictional gateways to obtain legal information. The jurisdictional servers are connected to respective secure jurisdictional gateways. This facilitate secure data exchange between the servers located in the jurisdictions, e.g. India, Germany, United States etc., with the application 220. This may assists the application 220 to update appropriate second software programs stored in the software program repository. The application 220 may also store the updated legal formats, documents, form layouts etc. for the given jurisdiction. The application 220 may execute in the distributed network 210. There may be multiple applications executing in the distributed network 210 similar to the application 220. The distributed network 210 may be a localized distributed network. In an embodiment, the application 220 may include a communicator 214. The communicator 214 may send and receive data. The communication with the application 220 takes place through the communicator 214. In one embodiment, the communicator 214 of the application 220 may receive service requests from enterprise applications (242, 244, 246) executing in an on-demand environment. The on-demand environment may enable users to access software applications or enterprise applications remotely at run time, when and where needed. The enterprise applications (244, 246) may execute in another distributed network 240. In another embodiment, the communicator 214 may receive service requests from enterprise applications (252, 254, 256) executing in an on-premise environment through the server 250. The on-premise environment may enable users to access software applications or enterprise applications that are installed and operated from an in-house server or computing infrastructure.

In an embodiment, the communicator 214, may include a request-identifier that may be able to segregate the service request based on the service call parameters. For example, the request-identifier may segregate the received service request based on object oriented request, e.g., java based requests In another, the request-identifier may segregate the received service requests based on data processing, e.g., ABAP based requests. The ABAP based requests may also relate to object oriented. In an embodiment, once the received service requests are segregated, the receiver sends the received service requests to an authorization module 212.

In an embodiment, the application 220 includes an authorization module 212 that authorizes the service requests received at the communicator 214. The authorization module 212 checks the field values of authorization parameters related to authorization objects. In an embodiment, the authorization module 212 may authorize the received service request in multiple authorizations steps. For example, in first step, the authorization module 212 authorizes the network or server, e.g. the distributed network 240 or server 250, from where the service request is received. In other words, the authorization module 212 authorizes the network through which the service request is received. Additionally, the authorization module 212 also authorizes the enterprise application from where the service request is received. For example, the enterprise applications (242, 244, 246) executing in the on-demand environment or enterprise applications (252, 254, 256) executing in the on-premise environment in as shown in the FIG. 2. In the second step, once the enterprise application is authorized, the authorization module 212 checks whether the authorized enterprise application has the required permissions to request for the required service. In the third step, upon successful authorization of the service, the authorization module 212 authorizes the functions to be performed and user roles permissions associated with the requested service. Upon successful completion of the authorization steps, the authorization module 212 transfers the service requests to the execution module 216. When the field values of the authorization parameters corresponding to the authorization objects are met, this completes the authorization of the received service request.

The execution module 216 may trigger various modules of the application 220 such as but not limited to, analyzer 218, extractor 222, matching module 226 and integration module 228. The analyzer 218 of the execution module 216, receive the service requests from the authorization module 212 for further analysis. The analyzer 218 may execute the program code to identify a first software program associated with the service request. The first software program may relates to program code that may be mapped and integrated with another program code, e.g. second software program, to generate a localization software program. Execution of the localization software programs facilitates completion of a business process. The generated localization software program is provided as a service to the received the service request. The generated localization software programs that provides access to the software and to software and its functions remotely as a Web-based service.

For example, the service request may relate to payments or wages to be received by the farmer according to the existing Cuban government laws. In this example, considering that the service request is received from the enterprise application 244 executing in the distributed network 240. The enterprise application 244 may be an enterprise resource planning (ERP) software. The enterprise application 244 i.e. ERP software may be composed of ERP modules, e.g. product planning, material purchasing, inventory control, distribution, accounting, marketing, finance, resource management, order management, customer management, vendor management, supply chain and logistic, warehouse management and the like. In the above example, the enterprise application 244 may be used for managing farmers and corresponding agricultural activities related to sugarcane farming. A first part of the resource management module may be executing at the enterprise application 244. This first part of the resource management module may be used for capturing agricultural activities performed by the registered farmers on daily basis. The first part of the resource management module is considered as a first software program for the sake of brevity and understanding in this example.

The received service request may include information of the first software program, e.g. the first part of the resource management module. The software program repository 234 stores second software programs that may be mapped and integrated with another program code, e.g. the first software program associated with the service request, to generate the localization software program. In the above example, a second part of the resource management module is stored in the software program repository 234. This second part of the resource management module may facilitate computing payments for the farmers based on the tasks/activities performed. In an exemplary embodiment, the second software program e.g. may relate to the second part of the resource management module may relate to payroll. In an exemplary embodiment, the software program repository 234 may be a localized database that stores program codes for software localization.

The analyzer 218 receives the service request from the authorization module 212 upon successfully authorization. The analyzer 218 may include an identifier that may assists in identifying the first software program that is associated with the received service request. In an exemplary embodiment, the service request received by the analyzer 218 entails request for computing wages to be received by the farmers according to the Cuban government laws. In an embodiment, the analyzer 218 may also include a task determiner to determine the task to be executed from the received service request. For example, the task determiner of the analyzer 218 determines the task, of generating a report entailing payments to be received by the farmers based on the agricultural activities performed according to Cuban government law, from the received service request. Once the first software program is identified and the task associated with service request received, the analyzer 218 sends it to the extractor 222. In an exemplary embodiment, the analyzer 218 may corresponds to SAP HANA® Cloud Platform (HCP) micro services provided by SAP® SE. The micro services offered by HCP are independent, modular, autonomous, self-contained implemented with service-oriented architecture principles to a small level of granularity.

The extractor 222 receives the identified first software program and the determined task associated with the received service request. The extractor 222 communicates with data retrieval module 232 to retrieve a list of second software programs from the software program repository 234. The extractor 222 also sends jurisdictional information, e.g. country name such as Cuba, to the retrieval module 232. The data retrieval module 232 may retrieve the list of second software programs from the software program repository 234. The list of second software programs retrieved are based on the information of the identified first software program and jurisdictional information received from the extractor 222. For example, since the identified first software program is the first part of the resource management module of the ERP, the list of corresponding second software programs may include workforce management, payroll, crop management, agricultural activities management, harvesting and post-harvest planning and the like. The list of second software programs retrieved from the software program repository 234 are in accordance with the given jurisdictional information, e.g. Cuba. In an embodiment, the extractor 222 sends the list of second software programs along with the received service request to the matching module 226. In an exemplary embodiment, the extractor 222 may corresponds to SAP HANA® Cloud Platform (HCP) micro services provided by SAP® SE.

The matching module 226 of the execution module 216 receives the list of retrieved second software programs and the identified first software program from the extractor 222. The matching module 226 may match the identified first software program with the list of the second software programs retrieved based on the determined task to be performed. The matching module 226 may also match the identified first software program with the list of the second software programs applicable in the given jurisdiction, e.g. Cuba. For examples, the task of generating report entailing payments to be received by the farmers based on the agricultural activities performed according to Cuban government laws. In an exemplary embodiment, the second part of the resource management module is matched with the payroll. In the example, the payment management may be considered as the second software program matched with the first software programs based on the determined task. In an embodiment, the first software program may be matched with more than one second software programs. For example, the first part of the resource management module may be matched with the agricultural activities management along with the payroll, which are the second software programs. The matching module 226 sends the matched second software program along with the received service request to integration module 228. In an exemplary embodiment, the matching module may corresponds to SAP HANA® Cloud Platform (HCP) micro services provided by SAP® SE.

The integration module 228 of the execution module 216 receives the matched second software program and the identified first software program. The integration module 228 integrates the matched second software program with the identified first software program to execute the determined task, e.g. computing payments to be received by the farmers based on the agricultural activities performed according to Cuban government laws. Upon successful completion of the integration generates the localization software program. The generated localization software program is provided as a service to the received service request. The application 220 may execute the localization software program to generate a set of handshaking parameters. Handshaking is an automated process of data communication between two software applications, e.g. enterprise application 220 and enterprise application 244. The handshaking parameters are dynamically generated for data exchange between the software applications. For example, the application 220 may retrieve data from the enterprise application 244 based on the handshaking parameters generated. The integration module 228 may communicate with the data retrieval module 232 to retrieve data corresponding to the set of handshaking parameters. The integration module 228 may retrieve data based on the determined task. For example, considering that enterprise application 244 operating in the distributed network 240 sent the service request to the application 220 initially.

In an embodiment, the set of handshaking parameters generated may relate to legal requirement of the given jurisdiction. In an embodiment, the integration module 228 sends retrieving request to the enterprise application 244 through the communicator 214 of the application 220. The enterprise application 244 fetches data based on the set of handshaking parameters received. The enterprise application 244 sends the fetched data to the application 220. For example, agricultural activities performed by farmers, time duration of the activities, crop instructions subscribed/provided, work absence etc. The enterprise application 244 sends the data to the application 220 corresponding to the received set of handshaking parameter. The integration module 228 receives the data through the communicator 214. In an embodiment, the application 420 retrieves data from the enterprise applications 244 corresponding to handshaking parameters generated. The application 420 may store the retrieve data in a temporary memory to analyze and generate reports. Once the reports are generated, the application 420 may delete the stored retrieved data from the temporary memory.

In an embodiment, the application 220 may execute the generated localization program to execute the determined task, at the integration module 228. Executing the determined task at the integration module 228 may include executing the task by the integrated first software program and the second software program based on the data received from the service request sender, e.g. enterprise application 244. In an embodiment, upon successful execution of the localization software program, a report-data may be generated as an output. In an embodiment, the generated localization software program is provided as a service to the received service request to generate reports. The integration module 228 again communicates with the data retrieval module 232 to retrieve report formats or documents stored at the software program repository 234. The data retrieval module 232 retrieves appropriate reports formats corresponding to given jurisdictional information. In an embodiment, a report may be generated by arranging the report-data in the retrieved report format. In addition, the generated localization software program may also compute tax to be paid by the farmers based on payments received. The application 220 may connect with the legal authority of the given jurisdiction, for example, Cuba through secure gateway. The application 220 may send tax data to the corresponding legal authority. In an exemplary embodiment, the integration module 228 may relate to API management that permits integration of business processes and database sources from geographically dispersed locations using diverse technologies.

In an exemplary embodiment, the data retrieval module 232 may relate to a Structured Query Language (SQL) bridge in SAP HANA® platform. In an exemplary embodiment, the software program repository 234 may relate to core data services (CDS). In CDS the data models are described in the data definition languages to generate artifacts. These data artifacts may generate run time objects when data retrieval requests are received at the software program repository 234.

In an embodiment, the application 220 responds to the service request sender with the generated report. For example, the application 220 sends the report of wages to be received by the farmer according to the existing Cuban government laws to the enterprise application 244 executing in the distributed network 240.

Figure 3:
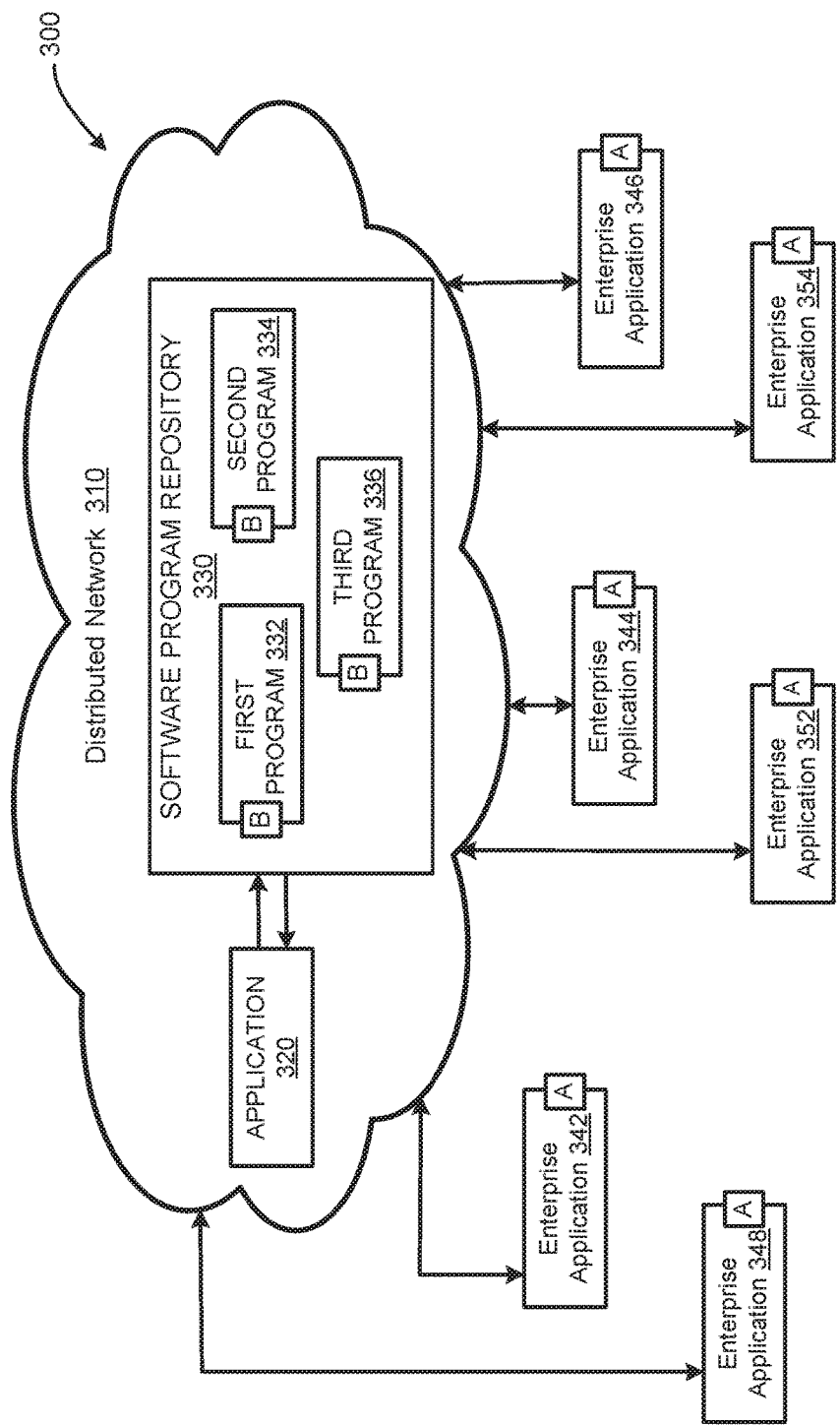
FIG. 3 illustrates a block diagram of a system deployed in a distributed network, according to one embodiment.

FIG. 3 illustrates a block diagram of a system 300 deployed in a distributed network 310, according to an embodiment. The system 300 may include an application 320 that may execute in the distributed network 310. There may be various other software applications similar to application 320 executing in the distributed network 310. The application 320 may be in communication with a software program repository 330. The application 320 communicates with the software program repository 330 to access the stored programs (332, 334, 336). The software program repository 330 may store multiple programs similar to programs (332, 334, 336). These programs may be accessed by the application 320 when a service request is received. The programs (332, 334, 346) may include a first routine referred by the reference alphabet 'B' as shown in the FIG. 3. In an embodiment, the first routine 'B' represents the different dynamically generated program codes.

The application 320 may receive service requests from the enterprise applications (342, 344, 346, 348, 352, 354). These enterprise applications (342, 344, 346, 348, 352, 354), for example, billing system, payment processing, content management, call center and customer support, customer relationship management (CRM), convergent charging, banking system, business continuity planning, human resource management (HRM), enterprise resource planning (ERP), messaging and collaboration system etc. These enterprise applications (342, 344, 346, 348, 352, 354) may be executing either on an on-demand environment or on an on-premise environment. The enterprise applications (342, 344, 346, 348, 352, 354) may include multiple enterprise software modules that may be focused to one area of business process, e.g., product development, marketing etc. The enterprise applications (342, 344, 346, 348, 352, 354) may include a second routine referred by the reference alphabet 'A' as shown in the FIG. 3. The second routine 'A' may be dynamically generated program. This second routine 'A' may be same or different for different enterprise applications. In an embodiment, the enterprise applications (342, 344, 346, 348, 352, 354) may have multiple second routines 'A' based on the enterprise software module to be executed. For example, consider to automate employee life-cycle as the enterprise software module of the enterprise application 242. For example, the hire two retire cycle of an enterprise application 242 such as HRM.

In an embodiment, the first routine 'B' of the programs (332, 334, 346) stored in the software program repository 330. The first routine 'B' may be mapped and integrated with the second routine 'A' of the enterprise applications (342, 344, 346, 348, 352, 354) to generate multiple localization software programs. The localization software programs are generated based on the service request received at the application 320. For example, the employee life-cycle module of the enterprise application 242 i.e. HRM sends a request to the application 320 for career planning for a particular organizational department. The application 320 communicates with the software program repository 330 to retrieve the appropriate program from the list of programs (332, 334, 346) stored. In an embodiment, an instance of the matched program from the list of programs (332, 334, 346) is retrieved by the application 320. In an exemplary embodiment, the first program 332 may match with the received service request for career planning. The received service request entails information of the first routine 13' of the enterprise application 342. Once the matched first program 332 is retrieved, the application 320 integrates the first routine 'B' of the matched first program 332 with the second routine 'A' of the enterprise application 342 to generate the localization software program. Execution of the generated localization software program is provided as a service to the received service request. For example, the service provided by the localization software program is to generate reports. Once the integration is complete, the received service request entails data for the career planning for the organizational department, e.g., mobile development team. The localization software program may request for additional information from the enterprise application 342 based on a set of handshaking parameters generated. For example, profile of a mobile developer, software skills, hardware development skills, experience, software languages, education requirement, specific skills, and applications already developed etc. The employee life-cycle module of the enterprise application 242 upon receiving such request, responds to the application 320 with the requested information. On receiving the requested information the generated localization software program may analyze the received information and may generate a report-data. This generated report may entail information about career planning, for example, goal setting of the mentioned organizational department, e.g., mobile development team. In an embodiment, once the report-data is generated, at the application 320 may disintegrate the localization software program generated. The localization software program was generated based on the received service request. After successful generation of the reports, the localization software program is disintegrated. This is accomplished by detaching the first routine 'B' of the matched first program 332 from the second routine 'A' of the enterprise application 342. The application 320 may respond with the generated report-data based on the service request received from enterprise application 342.

In embodiment, the users or organization may purchase subscription of the application 320 for accessing a required set of programs (332, 334, 336) stored in one or more repositories similar to software program repository 330. The software program repository 330 may store programs that facilitate execution of one or more business process. The software program repository 330 may also store report formats, form layouts, documents etc. The application 320 may retrieve appropriate report format or form layout to arrange the generated report-data as when requested.

Figure 4:
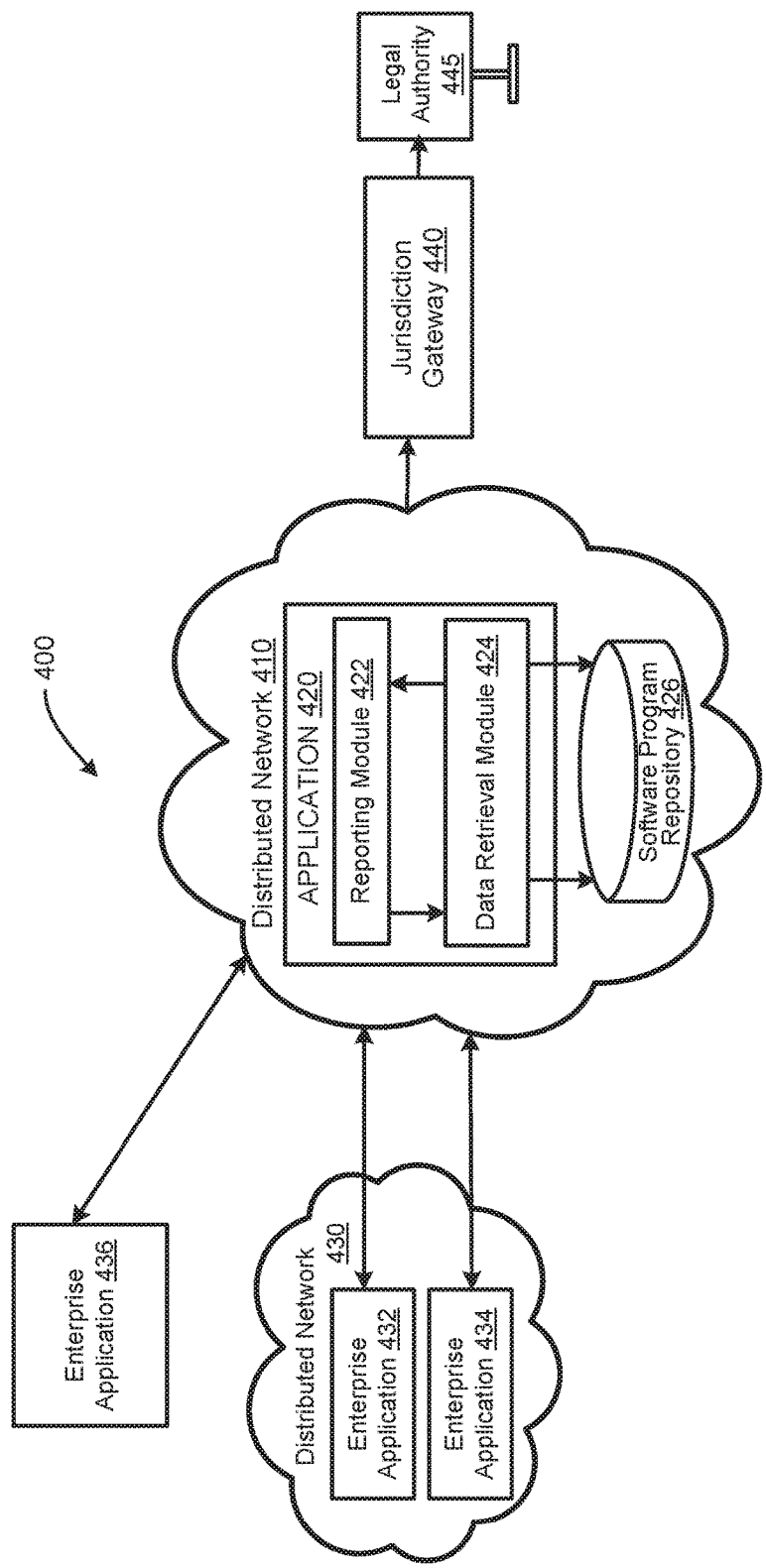
FIG. 4 illustrates a block diagram of a system deployed in a distributed network 410, according to one embodiment.

FIG. 4 illustrates a block diagram of a system 400 deployed in a distributed network 410, according to one embodiment. The system 400 may include an application 420 that may execute in the distributed network 410. There may be various other software applications similar to application 420 executing in the distributed network 410. The application 420 may receive service requests from multiple enterprise application operating on an on-demand environment or on an on-premise environment. In an exemplary embodiment, the enterprise application 432 and 434 may be executing in another distributed network 430 and enterprise application 436 may be executing individually. The enterprise applications (432, 434, 436) may connect with the distributed network 420 via network. The enterprise applications (432, 434, 436) may send or receive responses with respect to the service requests sent from the application 420.

In an embodiment, the system 400 may include one or more legal authorities of different jurisdictions, such as legal authority 445. A jurisdiction or a country may have many legal requirements and to accomplish this, the legal authority 445 may require legally processed data. The legal authority 445 may be connected with a secure jurisdiction gateway 440 to receive processed data from the application 420 executing in the distributed network 410. In an exemplary embodiment, considering legal authority 445 as revenue department of the jurisdiction named Germany. A mobile company 'MOBILE-ABC' may launch a mobile software product 'ABC-OS' that is a mobile operating system. Also considering that the 'ABC-OS' is the proprietary software product of the company 'MOBILE-ABC'. The company 'MOBILE-ABC' may generate revenue when a mobile device operating on the 'ABC-OS' is activated in Germany. In an exemplary embodiment, the company 'MOBILE-ABC' may be using enterprise application 436 for managing and recording the revenue generated by the mobile software product 'ABC-OS' worldwide. The revenue department of Germany may want to verify the tax paid by the company 'MOBILE-ABC' with respect to the revenue generated from mobile software product 'ABC-OS'. The application 420 may compute tax to be paid on total revenue generated by the company 'MOBILE-ABC' with respect to the mobile software product 'ABC-OS' in Germany. The application 420 may send the computed tax data to the legal authority 445 through the jurisdiction gateway 440 i.e. secure Germany gateway deployed with several firewall systems. The jurisdiction gateway 440 provides secure access to the third parties based on granted permission.

In an exemplary embodiment, the application 420 may communicate with the enterprise application 436 based on the legal time frame define by the legal authority 445, e.g. monthly, quarterly, half yearly, yearly etc., The application 420 sends a request to the enterprise application 436 for retrieving data related to revenue generated by the company 'MOBILE-ABC'. The enterprise application 436 may respond to application 420 with the requested data. The application 420 analyzes the data received from the enterprise application 436 and generates report-data based on the revenue generation of the company 'MOBILE-ABC'. The report-data is generated with respect to the revenue generated from the mobile software product 'ABC-OS' in the given jurisdiction i.e. Germany. In an embodiment, the application 420 may be connected with multiple repositories that may store jurisdictional documents or jurisdictional file formats or form layouts. In an embodiment, software program repository 426 stores the jurisdiction based documents, file formats or form layouts. The software program repository 426 may also store legal documents, file formats, form layouts that may be used for generating various legal documents.

For example, legal reports related to taxation acceptable in a particular jurisdiction, e.g. Germany. The application 420 may communicate with the software program repository 426 that stores software programs for executing an identified task. In an exemplary embodiment, the application 420 may retrieve the appropriate software programs, e.g. tax computing program from the software program repository 426. The retrieved software program from the software program repository 426 may relate to tax computing program. The tax computing program may include tax computing rules or legal policies associated with the given jurisdiction, e.g. Germany. The application 420 may compute the actual income tax to be paid by the company 'MOBILE-ABC' based on generated revenue and generates report-data. The application 420 may again communicate with the data retrieval module 424 to retrieve the appropriate file format or form layout for generating legal reports. The obtained legal reports are in acceptable condition to be accepted by the legal authority 445, e.g. revenue department of Germany.

The application 420 arranges the report-data generated based on the file format retrieved from the repository that stores file format information acceptable in Germany. In addition, the application 420 generates legal report on revenue generated by the company 'MOBILE-ABC' from the software product 'ABC-OS' in Germany. The application 420 may send the legal report as a response to the service request received from the legal authority 445. The legal authority 445, e.g. revenue department of Germany, may receive the legal report through the secure jurisdiction gateway 440.

In an embodiment, when the application 420 retrieves data from the enterprise applications (432, 434, 436) based on the received request to provide a service to the legal authority 445. The application 420 may store the retrieve data in a temporary memory to analyze and generate legal reports. Once the legal report is generated, the application 420 may delete the stored retrieved data from the temporary memory. In an embodiment, the legal authority 445 may purchase subscription of the distributed network 410 to access the application 420 for its services. In an embodiment, the distributed network 410 may be a localized distributed network. In an embodiment, the report-data or the legal reports are sent to the legal authority 445 through the secure jurisdiction gateway 440. At the jurisdiction gateway 440, the report-data or the legal reports may be temporarily stored in a repository. This repository may be accessible by the jurisdiction gateway 440. In an embodiment, legal authority 445 receives the report-data or the legal reports from the jurisdiction gateway 440. Upon receiving the report-data or the legal reports the legal authority may send acknowledgment to the application 420. Upon receiving the acknowledgement, the application 420 may send a request to the jurisdiction gateway 440 to delete the report-data or the legal reports stored in the repository.

Figure 5:
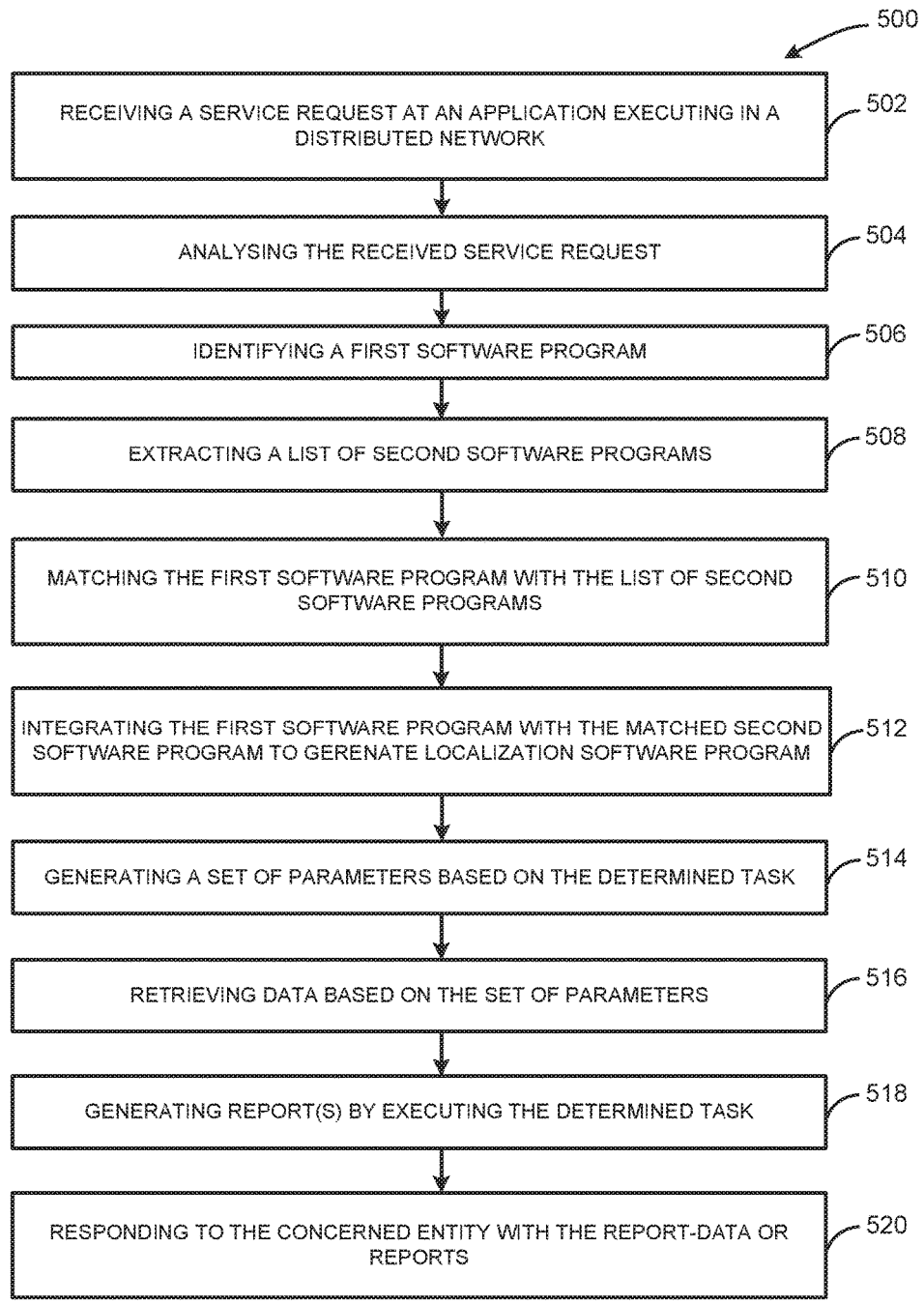
FIG. 5 illustrates a flow diagram of a method for executing software programs deployed in a distributed network, according to an embodiment.

FIG. 5 illustrates a flow diagram of a method 500 for executing software programs deployed in a distributed network, according to an embodiment. An application may be executing in the distributed network and connected with multiple software program repositories. The software program repositories may store multiple software programs that assist execution of business processes. The software program repositories may also store jurisdictional documents or jurisdictional file formats for report generation. In an embodiment, the application may communicate with a software program repository to access the stored software programs. For example, when the application receives service requests. The service requests may be sent by multiple enterprise applications operating either on an on-demand environment or on an on-premise environment. In an embodiment, the application may be a localized application or a cloud application executing in the distributed network or a localized distributed network.

In an embodiment, at block 502, the application, executing in the distributed network, may receive a service requests from an enterprise application. In an exemplary embodiment, a company 'COMPANY-A' may be a printing services company. A second company 'COMPANY-B' may have purchased subscription for printing services from 'COMPANY-A'. Similar to 'COMPANY-B' many other organizations or companies may have purchased subscription for printing services from 'COMPANY-A'. In an exemplary embodiment, 'COMPANY-A' may use enterprise applications such as 'PRINT-ERP' for managing and recording the printing requests received. In addition, 'COMPANY-A' may want to generate invoices for its respective clients such as 'COMPANY-B'. The enterprise application 'PRINT-ERP' sends invoice generation service request to the application 'APPLICATION-1' executing in the distributed network.

Next, at 504, the application analyzes the received service request from the enterprise application. For example, the application 'APPLICATION-1' analyzes the received invoice generation service request from the enterprise application 'PRINT-ERP'. At 506, after analyzing the service request, the application identifies the first software program associated with the received service request. For example, the application 'APPLICATION-1' identifies a first software program 'PRINT_SERVICE' associated with the invoice generation service request. The application also determines a task to be accomplished after identifying the first software program associated with the received service request. For example, the application 'APPLICATION-1' determines the task 'INVOICE GENERATION' from the received invoice generation service request.

At block 508, the application may extract a list of second software programs. The second software programs may be stored in a software program repository. The software program repository may be deployed in the same distributed network. For example, the application 'APPLICATION-1' extracts the list of second software programs such as 'TAXATION', 'INVOICING', 'PRINTING POLICIES', 'PRICING', etc. Next at 510, based on the list of second software programs extracted, the application may try to match the identified first software program with the list of second software programs. The application matches the identified first software program with the list of the second software programs with respect to the determined task to be executed. For example, the application 'APPLICATION-1' matches the first software program 'PRINT_SERVICE' with the list of the second software programs such as 'TAXATION', 'PRINTING POLICIES', 'INVOICING', 'PRICING' etc. The matching process is accomplished based on the determined task 'INVOICE GENERATION' to be executed.

Next at 512, the application integrates the identified first software program with the matched second software program to generate a localization software program to provide service to the received service request. The matching process comes to completion when the application comes across a second software program that matches with the identified first software program based on the determined task. The application integrates the identified first software program with the matched second software program to execute the determined task. For example, the application 'APPLICATION-1' integrates with the identified first software program 'PRINT_SERVICE' with the matched second software programs such as 'INVOICING', 'TAXATION' and 'PRINTING POLICIES' to generate localization software program 'COMPUTING INVOICE AND TAX FOR PRINT_SERVICE'. The localization software program is generated based on the determined task 'INVOICE GENERATION'.

At 514, once the identified first software program is integrated with the matched second software program to generate the localization software program. The localization software program generates a set of handshaking parameters based on the determined task. For example, the set of parameter generated by the localization software program for executing the determined task 'INVOICE GENERATION'. The set of parameters may include, 'customer pricing', 'printing requests received', 'discounts', 'printing rules', 'billing period' etc. Next at 516, the application may send a retrieve request to the enterprise application from where the service request was received initially. The application may send request for retrieving data corresponding to the set of handshaking parameters generated. For example, the application 'APPLICATION-1' requests for data from the enterprise application 'PRINT-ERP' based on the set of parameters 'customer pricing', 'printing requests received', 'discounts', 'printing rules', 'billing period' etc. generated.

At 518, upon receiving the requested data from the enterprise application, the application 'APPLICATION-1' may execute the localization software program. The localization software program may entailing the matched second software program 'PRINTING POLICIES' may retrieve printing policies based on jurisdiction. For example, in United Kingdom, document printing is received on 'A4' size papers. While in United States document printing is received on 'letter' size papers. The application 'APPLICATION-1' may further execute the localization software program entailing the other matched second software program 'INVOICING'. The localization software program may generate a report-data by executing the determined task. For example, a report-data may corresponds to an 'INVOICE' generated for the company 'COMPANY-B' based on the determined task 'INVOICE GENERATION'. Next at 520, the application may respond to the concerned entity with the generated reports based on the service request received. For example, the concerned entity may be the enterprise application from where the service request was received and/or legal authorities of a given jurisdiction. The application 'APPLICATION-1' sends the generated 'INVOICE' to the enterprise application 'PRINT-ERP' corresponding to the client company 'COMPANY-B'. In an exemplary embodiment, the application 'APPLICATION-1' may also send the 'INVOICE' to the company 'COMPANY-B' on behalf of company 'COMPANY-A'. In an embodiment, the application 'APPLICATION-1' may also executed the other matched second software program 'TAXATION' to compute the taxes to be paid based on the 'INVOICE' generated. In an exemplary embodiment, the company 'COMPANY-B' may be receiving printing services for its office locations in United Kingdom (UK) and United States (US). The application 'APPLICATION-1' compute taxes for the given jurisdiction locations e.g. United Kingdom and United States and generate corresponding tax report data-sets. The application 'APPLICATION-1' may send tax reports or tax report data-sets acceptable by the legal authorities of the given jurisdictions e.g. UK and US.

Some embodiments may include the above-described methods being written as one or more software components. These components and the associated functionality may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. These output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for generating jurisdiction based localization software programs, the method comprising:
   receiving, at a distributed network and from an application associated with a specific geographic jurisdiction, a service request for retrieving one or more software programs;
   analyzing, at the distributed network, the received service request, wherein the analysis, comprises:
      identifying a first software program associated with the received service request;
      determining a task to be executed from the received service request;
      extracting a list of second software programs stored in a memory accessible by the distributed network;
      selecting, from the extracted list of second software programs, a set of second software programs that match to the identified first software program based on the determined task and legal requirements of the specific geographic jurisdiction;

based on the determined task to be executed and the legal requirements of the specific geographic jurisdiction, identifying a set of pre-defined parameters associated with the matched second software programs;

extracting data from the identified first software program based on the identified set of pre-defined parameters associated with the matched second software programs;

based on the identified set of pre-defined parameters associated with the matched second programs and the data extracted from the identified first software program, integrating the identified first software program with a matched second software program from the list of second software programs to generate a localization software program;

in response to generating the localization software program, generating a set of handshaking parameters based on the determined task;

sending a request for retrieving data corresponding to the set of generated handshaking parameters;

executing the determined task from the localization software program based on the set of generated handshaking parameters; and upon execution of the determined task from the localization software program, detaching, at the distributed network, the identified first software program from the matched second software program retrieved from the memory.

2. The computer implemented method of claim 1, further comprising:

executing, at the distributed network, the determined task associated with the received service request; and in response to the execution of the determined task, computing an output of the executed task for the received service request.

3. The computer implemented method of claim 1, further comprising: based on a plurality of pre-defined set of security parameters and in response to an authorization, validating the received service request at the distributed network.

4. The computer implemented method of claim 1, wherein the set of the handshaking parameters relate to the legal requirements of the specific geographic jurisdiction, wherein the set of handshaking parameters are dynamically generated for data exchange between the software applications.

5. The computer implemented method of claim 1, wherein the list of second software programs are stored in a software program repository deployed in the same distributed network.

6. The computer-implemented method of claim 1, wherein analyzing the received service request further comprising:

extracting, from the received service request, an identifier associated with the first software program; and determining, from the extracted identifier, the specific geographic jurisdiction where the first software program is desired to be executed.

7. An article of manufacture including a non-transitory computer readable storage medium to tangibly store instructions, which when executed by a computer, cause the computer to:

receive, at a distributed network and from an application associated with a specific geographic jurisdiction, a service request for retrieving one or more software programs;

analyze at the distributed network, the received service request, wherein the analysis, comprises:

identifying a first software program associated with the received service request;

determining a task to be executed from the received service request;

extracting a list of second software programs stored in a memory accessible by the distributed network;

selecting, from the extracted list of second software programs, a set of second software programs that match to the identified first software program based on the determined task and legal requirements of the specific geographic jurisdiction;

based on the determined task to be executed and the legal requirements of the specific geographic jurisdiction, identifying a set of pre-defined parameters associated with the matched second software programs;

extracting data from the identified first software program based on the identified set of pre-defined parameters associated with the matched second software program;

based on the identified set of pre-defined parameters associated with the matched second programs and the data extracted from the identified first software program, integrating the identified first software program with a matched second software program from the list of second software programs to generate a localization software program;

in response to generating the localization software program, generating a set of handshaking parameters based on the determined task;

sending a request for retrieving data corresponding to the set of generated handshaking parameters;

executing the determined task from the localization software program based on the set of generated handshaking parameters; and upon execution of the determined task from the localization software program, detach, at the distributed network, the identified first software program from the matched second software program retrieved from the memory.

8. The article of manufacture of claim 7, further comprising instructions, which when executed by the computer, further causes the computer to:

execute, at the distributed network, the determined task associated with the service request; and in response to the execution of the determined task, compute an output of the executed task for the received service request.

9. The article of manufacture of claim 7, further comprising instructions, which when executed by the computer, further causes the computer to: based on a plurality of pre-defined set of security parameters and in response to an authorization, validate the received service request at the distributed network.

10. A computer system for generating jurisdiction based localization software programs, the system comprising:

a memory to store a program code;

a processor communicatively coupled to the memory, the processor configured to execute the program code to:

receive, at a distributed network and from an application associated with a specific geographic jurisdiction service request for retrieving software programs;

analyze, at the distributed network, the received service request, wherein the analysis, comprises:

identifying a first software program associated with the received service request;

determining a task to be executed from the received service request;

extracting a list of second software programs stored in a memory accessible by the distributed network;

selecting, from the extracted list of second software programs, a set of second software programs that match to the identified first software program based on the determined task and legal requirements of the specific geographic jurisdiction;

based on the determined task to be executed and the legal requirements of the specific geographic jurisdiction, identifying a set of pre-defined parameters associated with the matched second software programs;

extracting data from the identified first software program based on the identified set of pre-defined parameters associated with the matched second software program;

based on the identified set of pre-defined parameters associated with the matched second programs and the data extracted from the identified first software program, integrating the identified first software program with a matched second software program from the list of second software programs to generate a localization software program;

in response to generating the localization software program, generating a set of handshaking parameters based on the determined task;

sending a request for retrieving data corresponding to the set of generated handshaking parameters;

executing the determined task from the localization software program based on the set of generated handshaking parameters; and upon execution of the determined task from the localization software program, detaching, at the distributed network, the identified first software program from the matched second software program retrieved from the memory.

11. The computer system of claim 10, further comprising program code to:

execute, at the distributed network, the determined task associated with the received request; and in response to the execution of the determined task, compute an output of the executed task for the received service request.

12. The computer system of claim 10, further comprising program code to: based on a plurality of pre-defined set of security parameters and in response to an authorization, validate the received service request at the distributed network.

* * * * *